Figures 1, 2:
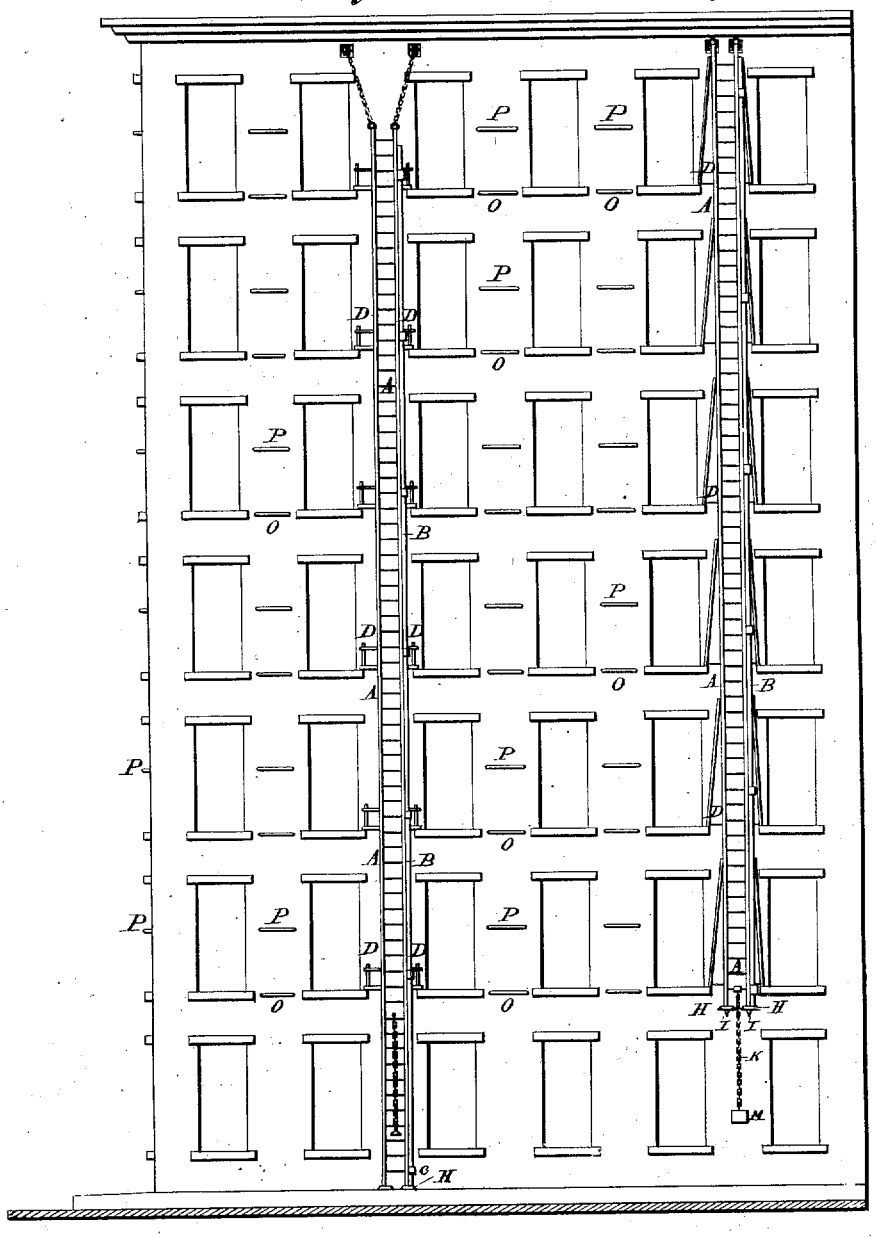
Figures 5, 6, 7, 8:
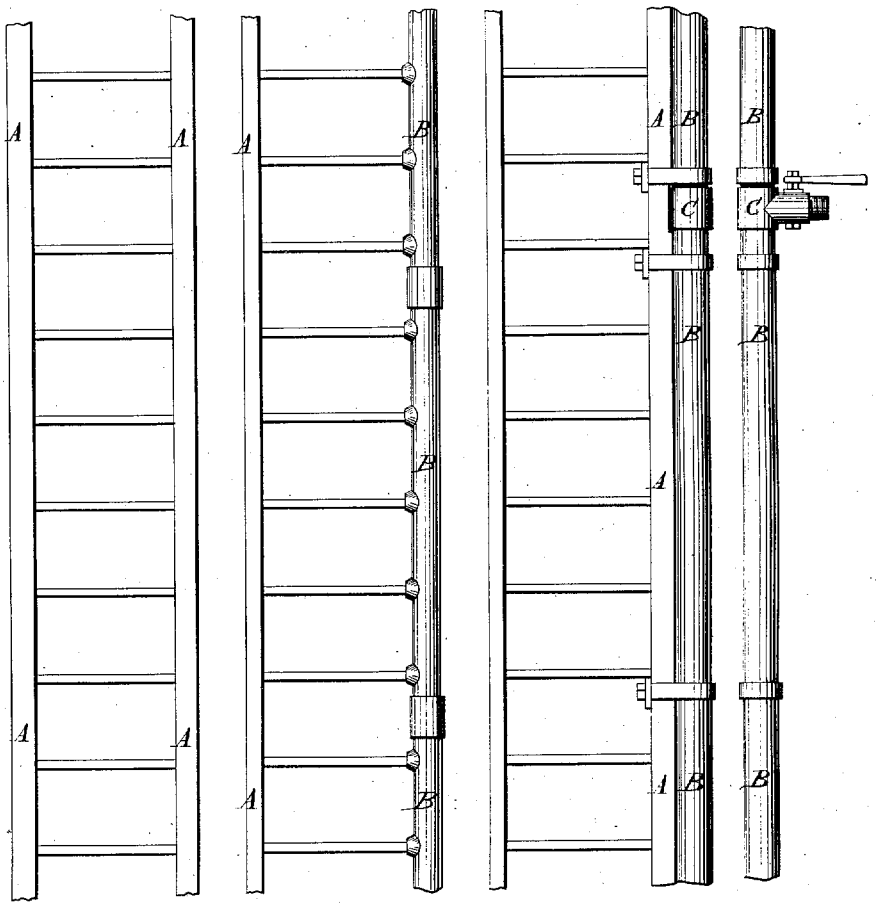
Figures 9, 10, 11, 12:
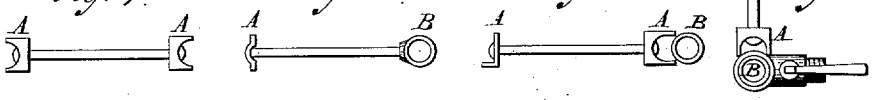

F. W. HOFELE,

Assignor to E. S. ALLEN.

FOLDING FIRE ESCAPE LADDER.

No. 10,726. Reissued May 18, 1886.

WITNESSES:

A. Schohl

Carl Kark

INVENTOR

Ferdinand W. Hofele

BY

Geipel & Ruegner

ATTORNEYS.

F. W. HOFELE,
Assignor to E. S. ALLEN.
FOLDING FIRE ESCAPE LADDER.
No. 10,726. Reissued May 18, 1886.
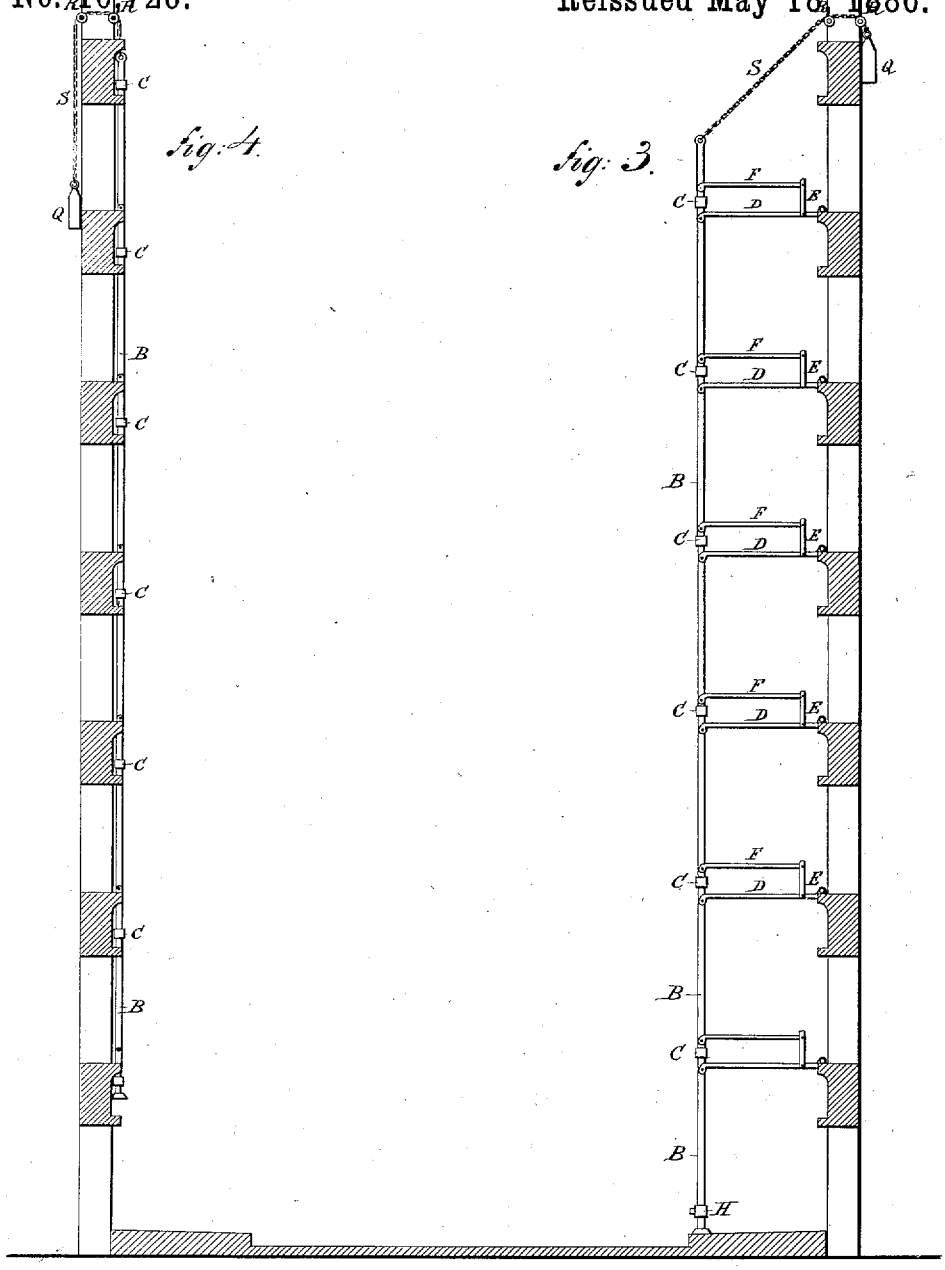
WITNESSES:
A. Schehl.
Carl Karp
INVENTOR
Ferdinand W. Hofele
BY
Goepel & Raegener
ATTORNEYS

F. W. HOFELE,

Assignor to E. S. ALLEN.

FOLDING FIRE ESCAPE LADDER.

No. 10,726. Reissued May 18, 1886.

WITNESSES:

A. Schehl.

Carl Karp

INVENTOR

Ferdinand W. Hofele

BY Goepel & Raegener

ATTORNEYS.

F. W. HOFELE,

Assignor to E. S. ALLEN.

FOLDING FIRE ESCAPE LADDER.

No. 10,726. Reissued May 18, 1886.

WITNESSES:

A. Schehl.

Carl Kay

INVENTOR

Ferdinand W. Hofele

BY

Goepel & Raegener

ATTORNEYS.

F. W. HOFELE,

Assignor to E. S. ALLEN.

FOLDING FIRE ESCAPE LADDER.

No. 10,726. Reissued May 18, 1886.

WITNESSES:

A. Schehl.

Carl Kapp

INVENTOR

Ferdinand W. Hofele

BY Goepel & Raegener

ATTORNEYS.

F. W. HOFELE,

Assignor to E. S. ALLEN.

FOLDING FIRE ESCAPE LADDER.

No. 10,726. Reissued May 18, 1886.

WITNESSES:

F. W. Rosenbaum.

Carl Kapp

INVENTOR

Ferdinand W. Hofele

BY Goepel & Raegener

ATTORNEYS.

UNITED STATES PATENT OFFICE.

FERDINAND W. HOFELE, OF NEW YORK, ASSIGNOR TO EBEN S. ALLEN, OF LARCHMONT, N. Y.

FOLDING FIRE-ESCAPE LADDER.

SPECIFICATION forming part of Reissued Letters Patent No. 10,726, dated May 18, 1886.

Original No. 294,319, dated February 26, 1884. Application for reissue filed April 15, 1884. Serial No. 128,029.

*To all whom it may concern:*

Be it known that I, FERDINAND W. HOFELE, of the city, county, and State of New York, have invented certain new and useful Improvements in Folding Fire-Escape Ladders; and I do hereby declare the following is a full, clear, and exact description.

This invention has reference to an improved folding fire-escape ladder which is permanently connected to the building and adapted to rest closely against the same when not in use, but which is set at some distance therefrom when lowered, so as to furnish a convenient and safe escape for the occupants of the building and a convenient means of access for the firemen to the building.

The invention consists of a vertical fire-escape ladder that is connected by folding platforms with the building, and adapted to be folded up closely thereto or set at a suitable distance from the building when lowered. The entire fire-escape ladder and its folding platforms are counterbalanced by weights that hold the ladder in folded position close to the building, but admit the lowering of the same when the locking spring-hook is released therefrom. The counterbalancing-weights are hung to chains which pass from the upper end of the ladder over pulleys arranged in extension-casings of the wall. The platforms are provided with openings next adjoining the ladder to permit the descent of persons at the inside of the ladder. Folding guard-rails are arranged at both sides of the platforms and adapted to fold up with the ladder and platforms against the building or set themselves in raised position when the same is lowered. One side post of the ladder is formed of a water-supply pipe that is provided with couplings at the lower end and at the different stories for attaching the hose.

The invention consists, further, of certain details of construction, which will be more fully described hereinafter, and finally pointed out in the claims.

Figure 13:
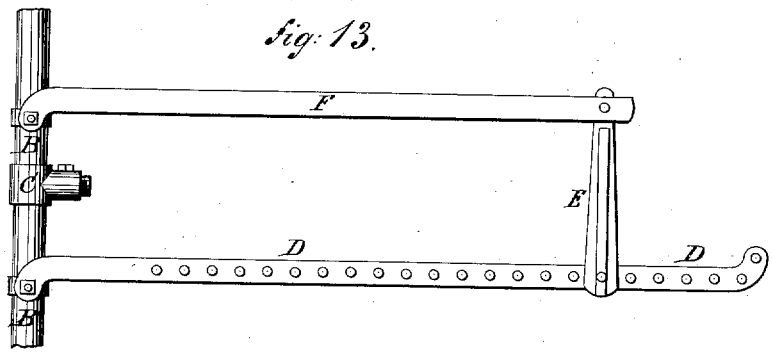
Figure 14:
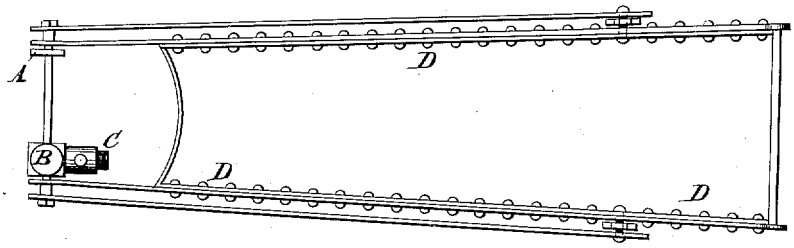
Figures 15, 16, 17, 18:
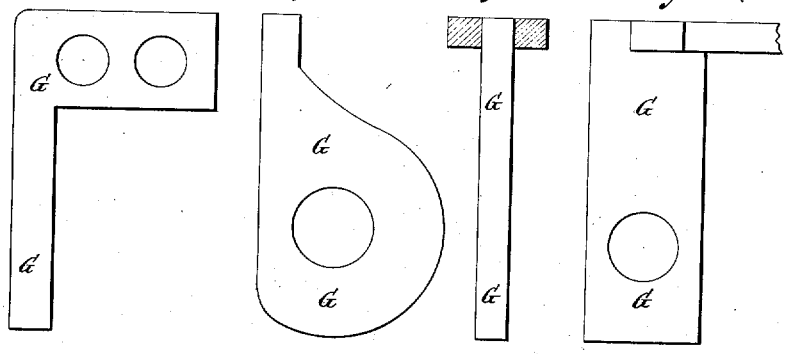
Figure 19:
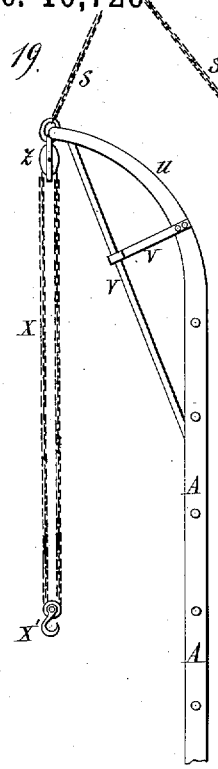
Figure 20:
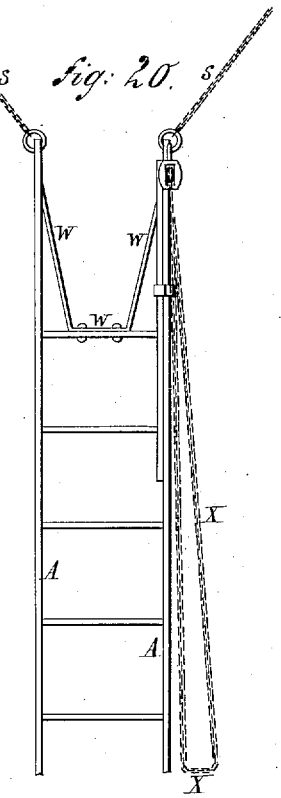
Figure 21:
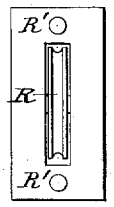
Figure 22:
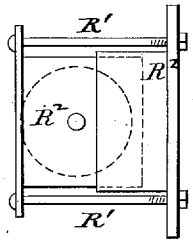
Figure 23:
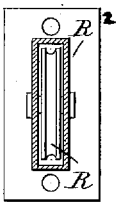
Figure 24:
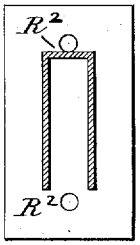
Figure 25:
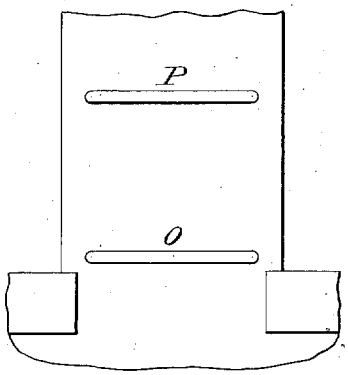
Figure 26:
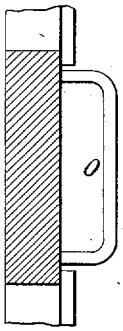
Figure 27:
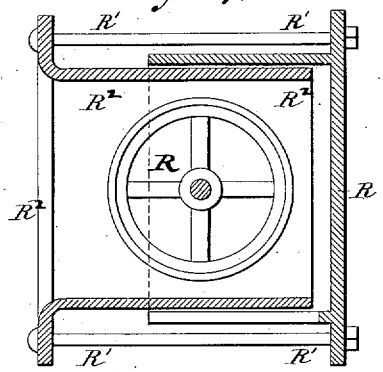
Figure 28:
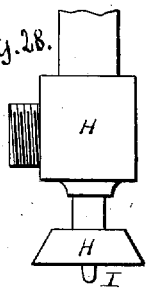
Figure 29:
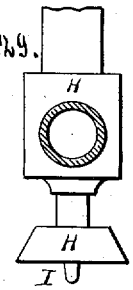
Figure 30:
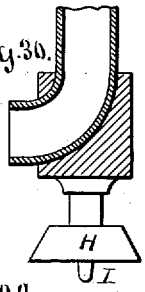
Figure 31:
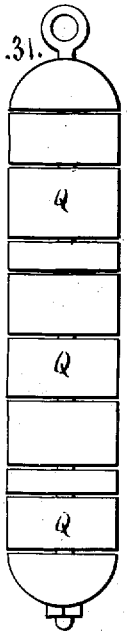
Figure 32:
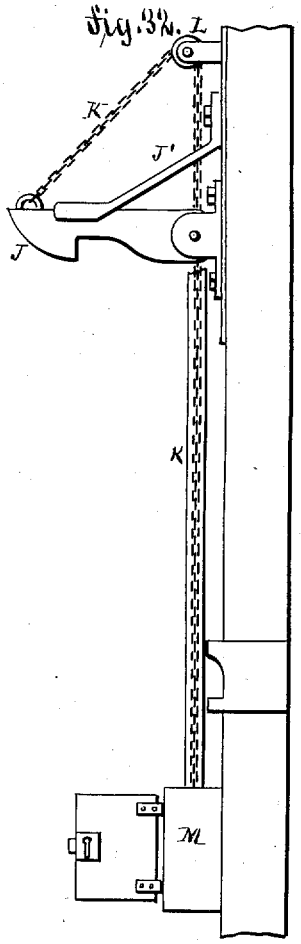
Figure 33:
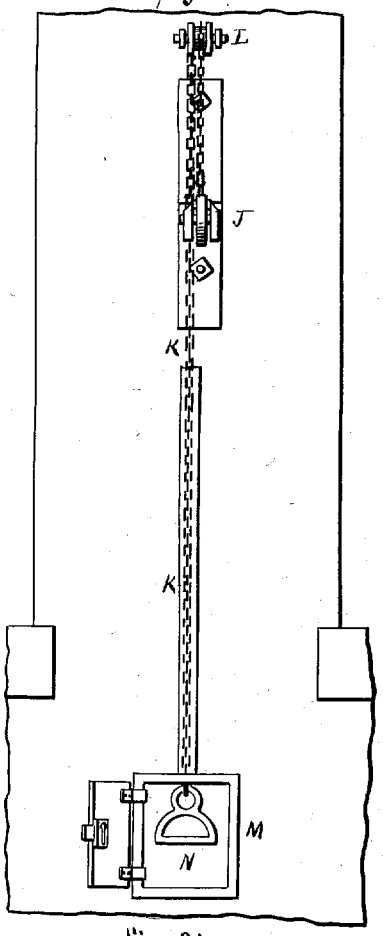
Figure 34:
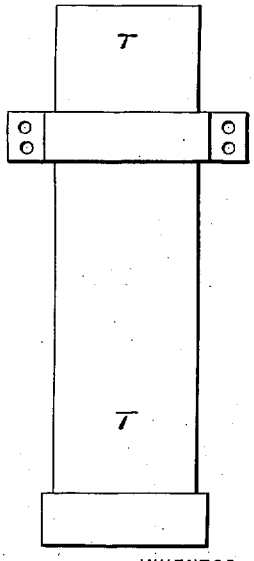
Figure 35:
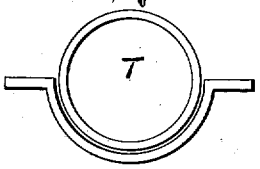

In the accompanying drawings, Figures 1 and 2 represent front elevations of my improved folding fire-escape ladder, showing the same respectively in lowered and raised positions. Figs. 3 and 4 are vertical transverse sections of a building, showing the fire-escape ladder respectively lowered and raised. Figs. 5, 6, 7, and 8 are detail front views of the ladder, showing different constructions of the same and of the stand-pipe forming one of the side posts of the ladder. Figs. 9, 10, 11, and 12 are horizontal sections of the different constructions of the ladder shown in Figs. 5 to 8. Figs. 13 and 14 are a detail side view and a plan of the escape-platform with its side railing. Figs. 15, 16, 17, and 18 are details of the eye-plates by which the platforms are hinged to the window-sills or wall of the building. Figs. 19 and 20 are a side view and a front view of the curved and braced top part of the ladder. Figs. 21 to 24 are details of the pulleys for the counterbalancing-chains and their extension-casings. Figs. 25 and 26 are detail front and side views of the bars or rungs arranged in the wall, to be used in connection with the fire-escape. Fig. 27 is an enlarged vertical longitudinal section of the guide-pulley and its extension-casing. Figs. 28, 29, and 30 are details of the bottom of the ladder and its hose-coupling. Fig. 31 is a detail side view of one of the counter-weights. Figs. 32 and 33 are detail side and front views of the locking-hook by which the fire escape is secured to the building when not in use, and its unhitching mechanism; and Figs. 34 and 35 show a side view and plan of the guide-casing for counter-weights.

Similar letters of reference indicate corresponding parts.

Referring to the drawings, A represents a vertical ladder, which is arranged at a suitable distance from the building, and constructed either of side posts made of pipe or of iron of suitable cross-section, so as to give the required strength to the ladder. The ladder A may be made with a stand-pipe, B, at one side, which latter is provided with a valved coupling, C, for each floor, to which the hose may be coupled, so as to supply water for each story when needed. The stand-pipe B is further provided at or near its lower part with a coupling, H, to make connection with the hose of the engine. The upright ladder A is connected by folding platforms D, one for each floor, with the wall of the building, the platforms D being pivoted to the side posts of the ladder and hinged to eyes G, that are anchored to the window-sills or to the wall of the building. The platforms D are floored over with sheet-iron or with iron in any form required, which flooring is riveted to the side rails of the platforms. The floors of the platforms D extend only to such a distance from the ladder that sufficient space is left for the descent of the persons between the ladder and the platforms, as shown clearly in Fig. 14. A guard-railing is arranged at each side of the platforms and formed of upright posts E, which are pivoted to the side rails of the platforms, and of horizontal rails F F, pivoted to the upper ends of the posts B and to the side posts of the ladder. The guard-railings give the required safety for persons passing over the platforms to the ladder. The posts E are arranged at such a distance from the wall that persons can readily step from the window-sills to the platforms.

To the upper end of the ladder A are attached the counterweight chains S S, which pass over wall-pulleys R R, that are arranged in extension-casings $R^2$, connected by bolts R′. The extension-casings $R^2$ of the pulleys R can be fitted to any thickness of wall and protect the pulleys against rain or snow.

To the ends of the chains S S, at the inside of the wall, are applied heavy weights Q Q, that counterbalance the fire-escape ladder A and platforms D. These weights are inclosed in iron boxes or pipes T, arranged at the inside of the wall, so that the counter-weights cannot be interfered with by driving nails into the wall, or by other obstructions.

The upper curved end of the ladder A is stiffened by braces V, so as to give strength in case anything has to be hoisted or lowered.

A pulley, Z, is arranged at the upper end of the ladder, and an endless chain, X, having a hook, X′, passed over the pulley for hoisting or lowering things, as shown in Figs. 19 and 20. As there will be considerable side strain from the counter-weights Q Q, an extra stiffness is imparted to the upper end of the ladder by the side braces, W W, which are fastened to the upper rungs and the side posts, as shown in Fig. 20.

When the ladder is folded up in raised position against the wall, it is locked thereto by a ladder-hook, J, hinged to the wall and acted upon by a spring, J′. This hook locks the fire-escape ladder close to the wall of the building and keeps it in place. To the outer end of the hook is fastened a chain, K, which first passes upward and over a pulley, L, and then down to the box M. The lower end of the chain K is provided with a handle, N, so that when wanted the handle can be reached from the ground by any person.

The ladder-hook J can be placed at any section of the escape.

The box M, securing the handle and end of the chain, is made of light material, so that in case of the loss of the key the box may be quickly opened to lower the chain and ladder, as required.

Between the windows of the building are arranged horizontal wall rungs or bars O and P, as shown in Figs. 1, 25, and 26, by which means the fire-escape can be readily reached from any window of the building.

The lower ends of the side posts of the ladder are provided with enlarged feet or rests, H′, having points I at their under side that fit into holes of the sidewalk or ground, to relieve the strain when under pressure of water or otherwise, and to give extra security.

The fire-escape ladder is operated as follows: When it is folded in normal position against the wall of the building and retained in place by the ladder-hook J, the platforms D and their guard-railings E F are folded up between the upright ladder and the wall, as shown in Fig. 2. When the fire-escape is to be used, the box M is opened and the chain K pulled, so that the hook J is raised. The hook being thereby released from the ladder, the fire-escape will drop by its own weight in outward direction away from the building, the counter-weights balancing it in such a manner that the lowering takes place slowly and without falling too heavily on the ground. When the ladder arrives on the ground, so that its feet rest on the ground or street-surface, the platforms assume a horizontal position and the guard-railings a vertical position at both sides of the platforms, so that persons can pass from the building over the platforms and descend at the inside of the ladder, while the firemen mount the ladder at the outside and connect their hose to the coupling at the lower end of the stand-pipe B and at any intermediate point of the same, so as to bring the water to any required floor. When the fire-escape ladder is no longer required for use and the building is not destroyed, it is put back in its normal position against the wall by simply raising it until the spring-hook J will relock the ladder to the wall, as shown in Figs. 2 and 32 and 33.

Having thus described my invention, I claim as new and desire to secure by Letters Patent—

1. In a folding fire-escape connected permanently to a building, a continuous upright ladder constructed to rest closely against the building when not in use, and to be shifted bodily to some distance therefrom when it is to be used, substantially as herein set forth.

2. The combination of a vertical fire-escape ladder with folding platforms leading from the building to the ladder, said ladder being adapted to be folded against or set at a distance from the building, substantially as set forth.

3. The combination, with a vertical fire-escape ladder, of folding platforms connecting the ladder to the building, said platforms having guard-railings which are adapted to be folded with the platforms and ladder against the building, or set automatically in upright position when the ladder is lowered, substantially as set forth.

4. The combination of an upright fire-escape ladder, folding platforms connecting the ladder to the building, and means whereby the ladder is counterbalanced, so as to be shifted to a distance from the building or set closely against said building, substantially as set forth.

5. The combination, with a vertical fire-escape ladder, of folding platforms connecting the ladder to the building, chains attached to the upper end of the ladder, balance-weights attached to the ends of the chains, and pulleys for guiding the chains, substantially as set forth.

6. In a folding fire-escape ladder, the combination, with an upright ladder, A, of folding platforms D, connecting the ladder to the building, and folding guard-railings of less length than the platform, so as to give convenient access to the same from the windows of the building, substantially as set forth.

7. A fire-escape composed of a vertical ladder, A, folding platforms D, uprights E, and hand-rails F, substantially as set forth.

8. A fire-escape composed of a vertical ladder and folding platforms connecting the ladder to the wall of the building, one side post of the ladder being formed of a water-supply pipe, substantially as set forth.

9. A fire-escape consisting of a vertical ladder one side post of which is formed of a water-supply pipe, folding platforms, and folding guard-railings composed of uprights and hand-rails pivoted, respectively, to each other, to the platforms, and to the ladder, substantially as set forth.

10. The combination of a vertical fire-escape ladder and folding platforms connecting the ladder with the building, said platforms having openings adjoining the ladder of sufficient size to admit the descent of persons, substantially as described.

11. In a folding fire-escape ladder, the combination of a vertical ladder, folding platforms connecting the ladder with the building, counterbalancing-weights connected by chains with the upper end of the ladder, guide-pulleys for said chains, and extension-casings set into the wall and inclosing said pulleys, substantially as set forth.

12. The combination of a vertical ladder, folding platforms connecting the ladder with the building, means for counterbalancing the ladder and the platforms, and means whereby the ladder is locked in normal position close to the building, substantially as set forth.

13. The combination of a vertical ladder, folding platforms connecting the ladder with the building, means for counterbalancing the ladder, means for locking the same close to the building, and means for releasing the ladder when it is desired to lower the same, substantially as described.

14. The combination of a vertical fire-escape ladder, A, folding platforms D, connecting the ladder with the building, a spring-hook, J, hinged to the building and adapted to lock the ladder when placed close to the wall, and a chain, K, connected to the locking-hook and passed over a pulley for releasing the hook from the ladder, substantially as set forth.

15. The combination of a vertical fire-escape ladder, A, folding platforms D, connecting the ladder with the building, and eyebolts G, secured to the wall, the platforms being hinged to said eyebolts, substantially as set forth.

16. In a folding-platform fire-escape, a vertical ladder, one side post of which is formed of a stand-pipe, the lower end of which is provided with a coupling device for connecting the fire-hose with said stand-pipe, substantially as set forth.

17. In a folding fire-escape ladder, a vertical ladder one side post of which is formed of a stand-pipe having a coupling for the fire-hose at the lower end, and additional couplings above the same for the different stories, substantially as set forth.

18. In a folding-platform fire-escape, a vertical ladder, A, the side posts of which are provided with enlarged feet or rests having points at their under side, substantially as set forth.

In testimony whereof I have affixed my signature in presence of two witnesses.

FERDINAND W. HOFELE.

Witnesses:

PAUL GOEPEL,
SIDNEY MANN.